(12) United States Patent
Allard (10) Patent No.: US 6,733,209 B2
(45) Date of Patent: May 11, 2004

(54) CHITOSAN ENHANCED EROSION CONTROL ROLLS

(75) Inventor: Douglas Paul Allard, Santa Rosa, CA (US)

(73) Assignee: KriStar Enterprises, Inc., Santa Rosa, CA (US)

( * ) Notice: Subject to any disclaimer, the term of this patent is extended or adjusted under 35 U.S.C. 154(b) by 0 days.

(21) Appl. No.: 10/052,624

(22) Filed: Jan. 17, 2002

(65) Prior Publication Data

US 2002/0155237 A1 Oct. 24, 2002

Related U.S. Application Data

(63) Continuation-in-part of application No. 09/660,223, filed on Sep. 12, 2000, which is a continuation-in-part of application No. 09/479,341, filed on Jan. 7, 2000.

(51) Int. Cl.[7] .............................. E02D 17/20; E02B 3/00
(52) U.S. Cl. ................................ 405/302.6; 405/302.7
(58) Field of Search ........................... 405/302.4, 302.6, 405/302.7, 36, 49, 43, 44, 45

(56) References Cited

U.S. PATENT DOCUMENTS

| | | | | |
|---|---|---|---|---|
| 3,917,530 A | * | 11/1975 | Boske | 405/36 |
| 3,936,380 A | | 2/1976 | Boske | 210/170 |
| 3,946,762 A | | 3/1976 | Green | 138/140 |
| 3,976,578 A | * | 8/1976 | Beane | 405/49 |
| 4,182,580 A | * | 1/1980 | Hieda et al. | 405/43 |
| 4,182,581 A | * | 1/1980 | Uehara et al. | 405/43 |
| 5,308,663 A | * | 5/1994 | Nakagawa et al. | 428/34.2 |
| 5,338,131 A | | 8/1994 | Bestmann | 405/24 |
| 5,468,536 A | * | 11/1995 | Whitcomb et al. | 405/63 |
| 5,575,588 A | | 11/1996 | Nakamura | 405/18 |
| 5,595,458 A | | 1/1997 | Grabhorn | 405/258 |
| 5,954,451 A | * | 9/1999 | Presby | 405/49 |

OTHER PUBLICATIONS

Vanson, Inc.; web page: "Product Information : Chitin/Chitosan : Vanson"; http://vanson.com/chi/; 2 pages.
Vanson, Inc.; web page: "Waste Water Applications. : Vanson"; http://vanson.com/wwa/; ©, 2001, 2 pages.
Vanson, Inc.; web page: "Vanson Chitin Chitosan and Chitosan Derivativ . . . "; http://vanson.com/swa/; ©2001; 1 page.
Vanson, Inc.; web page: "Storm Water Applications : Vanson"; http://vanson.com/chi/; ©2001; 1 page.
American Excelsior Company, Suggested Specification for Excelsior Degradable Sediment Control Rolls (Sep. 1996) (5 pages).
CD43(2) Fiber Rolls, Caltrans Storm Water Quality Handbooks, Construction Contractor's Guide and Specifications (Apr. 1997) (3 pages).

* cited by examiner

*Primary Examiner*—Frederick L. Lagman
(74) *Attorney, Agent, or Firm*—Glenn W. Rhodes; Heather H. Fan; Howrey Simon Arnold & White, LLP (57) ABSTRACT

A chitosan enhanced erosion control device is described. A walled elongated core member is disclosed having a first open end, a second end, an interior space and one or more openings in the wall communicating the interior space with the exterior of the core member. An outer filter member surrounds the core member. One or both the first and second ends of the core member can be open. One or both of the open ends can comprise couplers or connectors for connecting one core member to one or two complimentary core members. The core member may comprise a flexible plastic pipe, such as high-density polyethylene pipe having a plurality of perforations. Chitosan may be added to one or more device elements to assist in removing unwanted silt and contamination from passing fluid.

26 Claims, 8 Drawing Sheets

FIG. 8

CHITOSAN ENHANCED EROSION CONTROL ROLLS

NOTICE OF RELATED APPLICATIONS

This application is a continuation-in-part of co-pending U.S. patent application Ser. No. 09/660,223 filed on Sep. 12, 2000, which is in turn a continuation-in-part of co-pending U.S. patent application Ser. No. 09/479,341 filed on Jan. 7, 2000, both of which are incorporated by reference herein in their entirety.

FIELD OF THE INVENTION

The present invention relates generally to erosion control and more particularly to devices and apparatuses for use in controlling pollution, silt, sedimentation and debris flow associated with soil erosion.

BACKGROUND OF THE INVENTION

Controlling soil erosion, such as erosion on slopes in construction sites, and particularly the sedimentation and debris carried in fluid flow on slopes is a continuing problem. Fiber rolls (also known as wattles) are the current industry standard for use in controlling erosion. Fiber rolls are typically made of fibrous materials such as straw or excelsior (shredded wood) made into rolls that are held together with netting. During construction, the rolls are placed across the face of a slope to curtail soil erosion and to dam, direct and/or filter fluid flow as the fluid flows down the slope. Silt fences, generally black porous cloth strung vertically on wooden stakes across a slope, are alternative means of controlling erosion. However, most regulatory agencies now discourage the use of silt fences due to the propensity for silt fences to collapse from high fluid flows and high winds. Fiber rolls have been found to be more capable of performing the erosion control function than silt fences. However, fiber rolls are deficient in their ability to direct fluid flow in a controlled manner. Moreover, numerous fiber rolls are generally required due to their inherent deficiencies in directing fluid flow as the flow proceeds down a slope.

Furthermore, in response to tighter guidelines recently imposed by the federal Environmental Protection Agency under the Clean Water Act, controlling pollution and erosion from storm water runoff is receiving ever-increasing attention at all levels of government, federal, state and local. Federal and state agencies have issued mandates and developed guidelines regarding the prevention of non-point source (storm water caused) pollution that require local governments to act upon or initiate. These mandates also affect water runoff from storms and other sources on slopes and construction sites. Fiber rolls or "wattles" have traditionally done a poor job of controlling or filtering pollution, debris or sediment from fluid flows, however, as water or runoff that flows from a fiber roll is typically substantially similar in nature to the water or runoff that flows into the fiber roll.

Chitosan is a well-known material that is derived from a naturally occurring substance called chitin, which is a polysaccharide found in the exoskeleton of shellfish such as shrimp, lobster, and/or crabs. While chitosan has recently gained popularity as a dietary supplement, its inherent ability to generate small electrical charges has also provided benefits in the processing of contaminated items, such as wastewater. In turbid or polluted water, the electrical charges given off by chitosan react with the small electrical charges in pollution, fine silt and sediment particles, such that many of these tiny bits of contamination and silt coagulate together into larger chunks. These larger coagulated chunks of particles can then be filtered more easily from the fluid and are also more prone to settle to the bottom of the fluid body via gravity. An appropriate application of chitosan can render a body of muddy water as fairly clear in a short period of time. While chitosan and chitin have been previously used to some extent in the treatment of wastewater, their use has yet to reach the field of storm water runoff with its accompanying objective to filter or clarify such water. Accordingly, more effective devices and systems are desired for controlling soil erosion and debris flow, and for filtering or clarifying fluid passing through such devices and systems.

SUMMARY OF THE INVENTION

The present invention comprises a walled elongated core member having a first open end, a second end, an interior space and one or more openings in the wall communicating the interior space with the exterior of the core member. An outer filter member surrounds the core member. In one embodiment, both the first and second ends of the core member are open. One feature of the present invention is the ability to connect a plurality of core members together. Accordingly, one or both of the open ends can comprise couplers or connectors for connecting one core member to one or two complimentary core members. The core member may comprise a flexible plastic pipe, such as high-density polyethylene pipe having a plurality of perforations.

In another embodiment, the couplers can comprise tee connectors or elbow connectors. One advantage of the present invention is the ability to connect outlet pipes to tee or elbow connectors for directing fluid flow received by the core members to desired locations downstream of the core members.

The outer filter member may comprise a fiber roll. In one embodiment the fiber roll comprises excelsior or straw. In another embodiment, the filter member may comprise a porous foam material. A porous covering material, such as a woven cloth or netting may surround the outer filter member.

In another embodiment, the elongated core member is corrugated, comprising a plurality of ribs extending along a least a portion of the exterior surface of the core member. One or more openings in the ribs communicate the interior of the core member with the exterior surface of the core member.

In another embodiment, the elongated core member comprises a flexible material have an interior space that is at least partially filled with a ballast material such as sand, gravel or the like. The elongated core member may further comprise openings communicating the exterior of the core member with the interior of the core member. One or more core members can be coupled together and strategically arranged to control the flow of sedimentation and debris.

In yet another embodiment, chitosan is applied to one or more parts of the fiber roll, preferably before the fiber roll is assembled. While a liquid form of chitosan is preferred, any other form, such as a powder, may be applied to the fiber roll. In the preferred embodiment, a liquid solution of chitosan is thoroughly sprayed onto a flat blanket comprising the outer filter member before this blanket is rolled around the elongated core member. This outer filter member preferably comprises excelsior, and is preferably left to dry for a period of time after the liquid solution is applied. Once assembled, the chitosan enhanced fiber roll is capable of coagulating fine solids in fluids, such that passage of pollution, silt and sediment through the fiber roll is reduced.

DETAILED DESCRIPTION OF THE INVENTION

The present invention is directed to an apparatus for use in controlling sedimentation and debris flow, especially on slopes. The present invention is particularly useful in controlling erosion resulting from sedimentation and debris flow on slopes in construction sites and other areas where soil erosion poses environmental issues.

Figure 1:
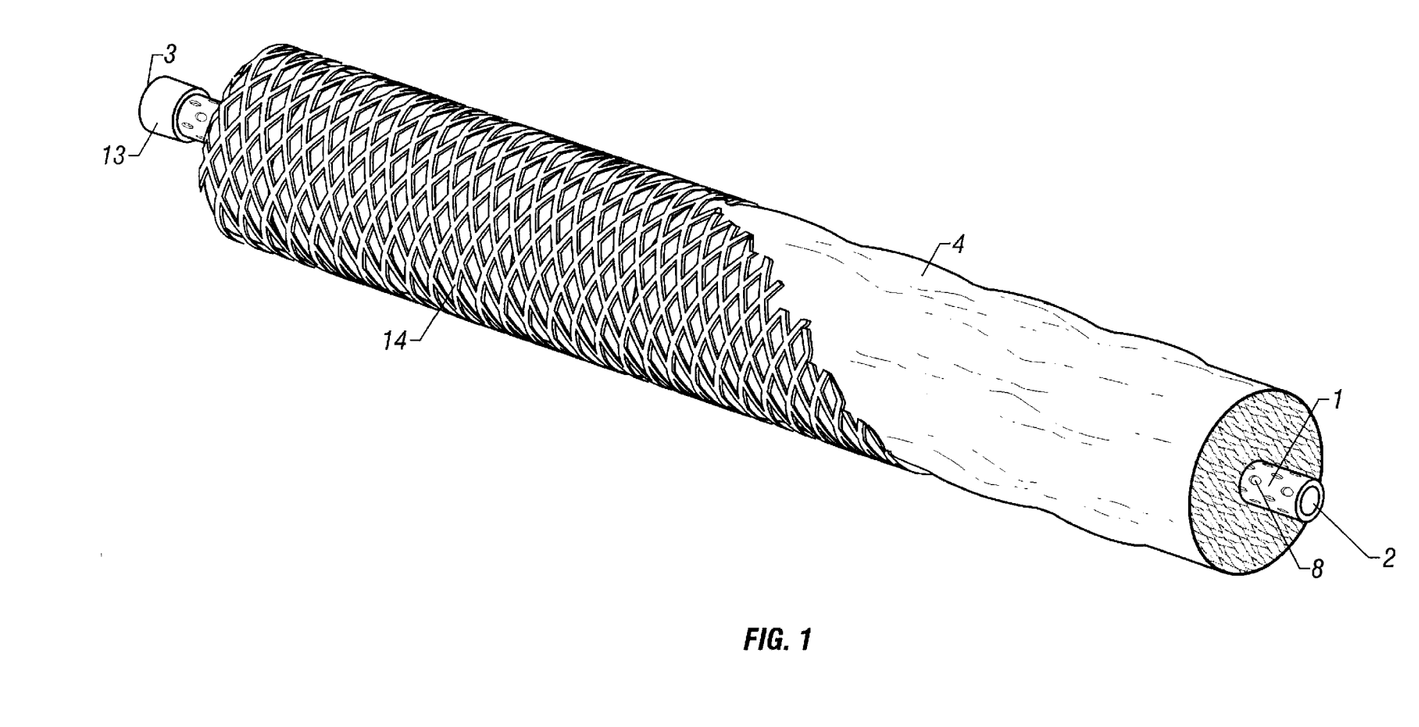
FIG. 1 is a perspective view of one embodiment of the present invention.

Referring to FIG. 1, one embodiment of the present invention is shown having a walled elongated core member 1, a first open end 2 and a second open end 3. The elongated core member has a longitudinal axis and a periphery extending around the core member in a line perpendicular to the longitudinal axis. The elongated member has an interior space and one or more openings in the wall communicating the interior space with the exterior of the core member. An outer filter member 4 surrounds the core member. In a preferred embodiment, both the first and second ends of the core member are open. One feature of the present invention is the ability to connect a plurality of core members together. Accordingly, one or both of the open ends can comprise couplers or connectors 13 for connecting one core member to one or two complimentary core members. The core member may comprise a flexible plastic pipe, such as high-density polyethylene pipe having a plurality of perforations. The connectors can be standard industry connectors or couplers for coupling piping such that the connected piping is in fluid communication with each other.

Figure 2A:
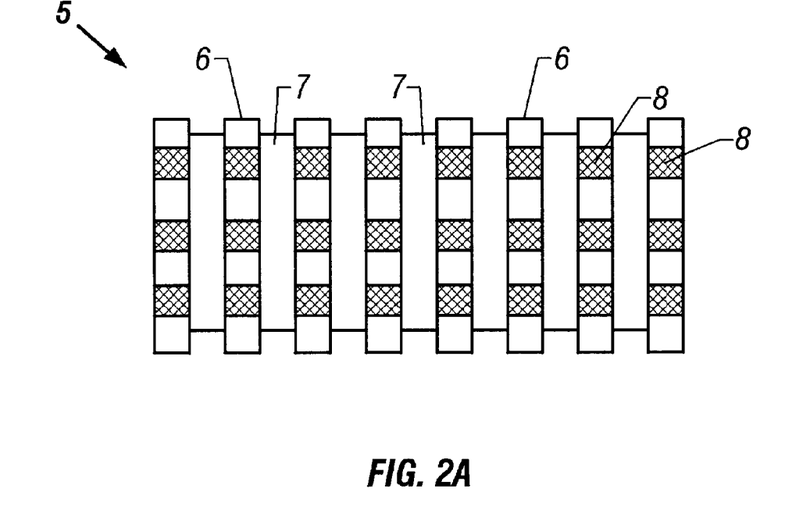
FIG. 2A is a front view of one embodiment of the present invention illustrating a corrugated core member.
Figure 2B:
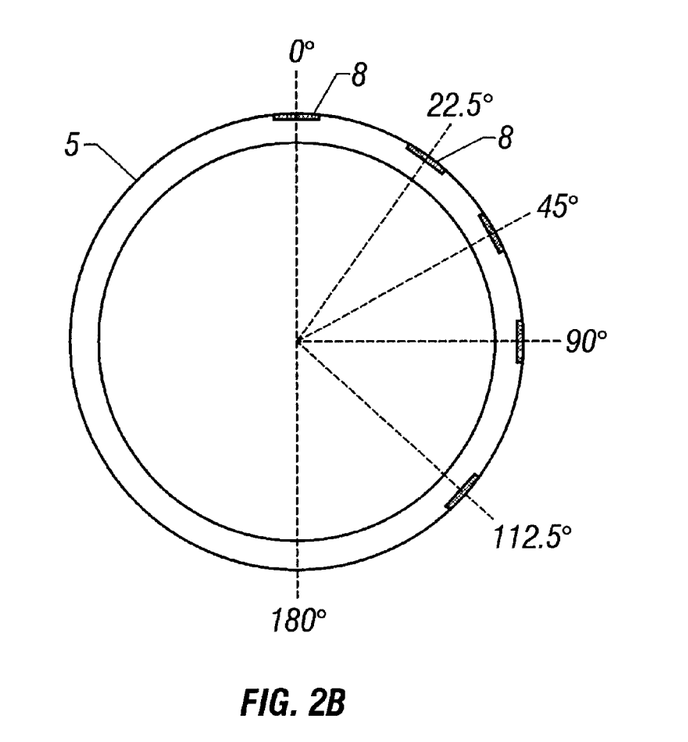
FIG. 2B is a side view of the corrugated core member illustrated in FIG. 2A.

Referring to FIGS. 2A and 2B, a corrugated core member 5 is illustrated showing ribs 6 and valleys 7. The ribs extend along at least a portion of the exterior surface of the core member. In the embodiment illustrated, the ribs extend along the periphery (i.e, perpendicular to the longitudinal axis of the member) of the exterior of core member. In an alternative embodiment, the ribs may extend along at least a portion of the exterior surface of the core member in a position parallel to the longitudinal axis of the member. One or more openings 8 are situated in one or more of the ribs. Preferably the openings are elongated slots located across the top of the rib. It is particularly preferred to locate a plurality of openings in the rib at spaced intervals along the periphery of the core member. For example, as more specifically illustrated in FIG. 2B, it is particularly preferred to space a plurality of openings from a first opening along the periphery of the member within a 180 degree arc as measured from the longitudinal axis of the core member. A particularly preferred pattern is to space four openings from a first opening at positions of approximately 22.5 degrees, 45 degrees, 90 degrees and 112.5 degrees from the first opening as measured along an arc from the longitudinal axis of the core member. In practice, the first opening is situated in the rib near the top of the core member (as it will be positioned in the particular erosion control and debris flow application) such that the additional openings will be situated towards the upstream side of the fluid flow path.

Figure 3:
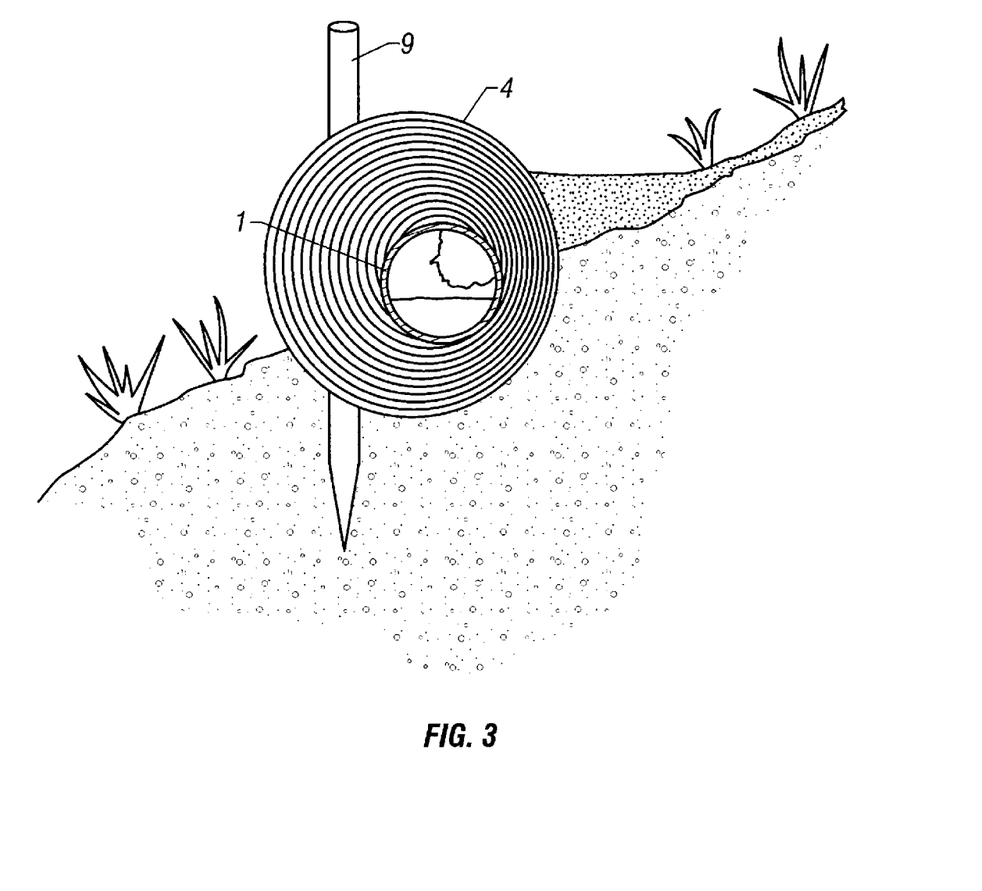
FIG. 3 is a side view of one embodiment of the present invention illustrating an eccentrically positioned core member within an outer filter member.

Referring to FIG. 3, the core member 1 is illustrated positioned within a filter member 4, such as a fiber roll, and anchored in place on a slope with an anchor 9, such as a stake. In the embodiment illustrated, the core member is positioned eccentrically within the filter member. As indicated previously with respect to FIGS. 2A and 2B, in a particularly preferred embodiment the openings in the rib are such that a first opening is situated near the top of the core member, and additional openings are positioned spaced apart from the first opening and upstream of the fluid flow path.

Figure 4:
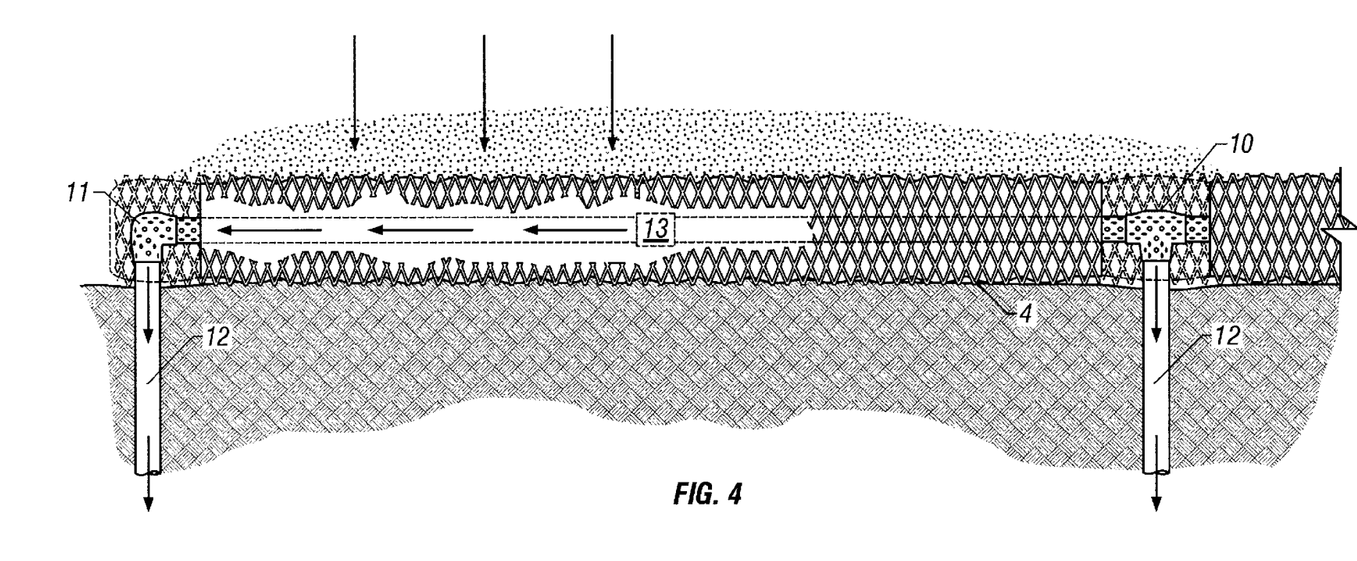
FIG. 4 is a front view of one embodiment of the present invention showing core members interconnected to each other and to outlet pipes.

Referring to FIG. 4, the couplers can comprise tee connectors 10 or elbow connectors 11. One advantage of the present invention is the ability to connect outlet pipes 12 to tee or elbow connectors for directing fluid flow received by the core members to desired locations downstream of the core members.

The outer filter member may comprise a fiber roll. In one embodiment the fiber roll comprises excelsior or straw. Referring again to FIG. 1, the filter member may comprise a porous foam material. As discussed, a porous covering material 14, such as a woven cloth or netting may surround the outer filter member. In a preferred embodiment wherein a plurality of core members are interconnected, the outer filter material will cover the couplers or connectors as well.

Figure 5:
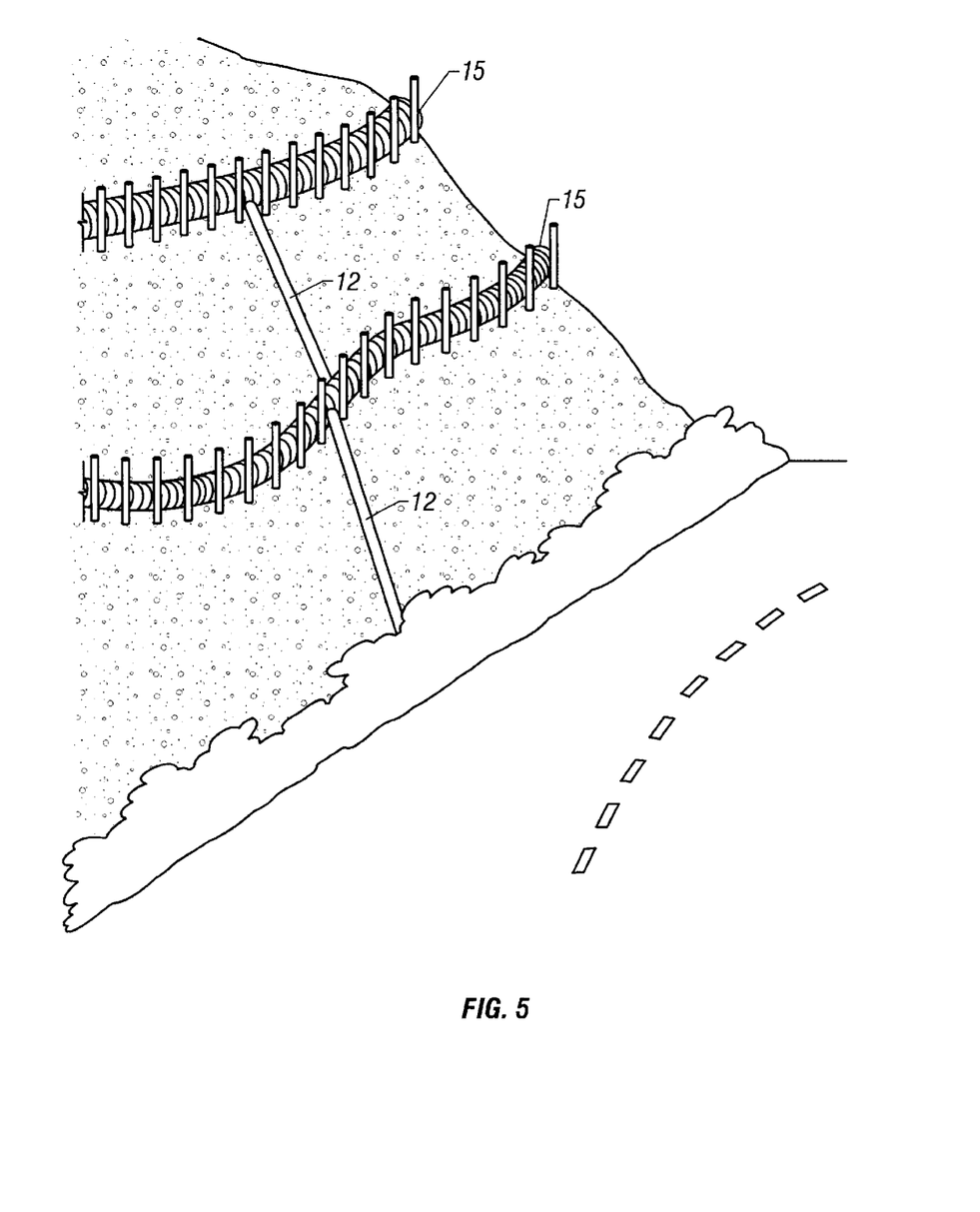
FIG. 5 is a perspective view of one embodiment of the present invention deployed on a sloping surface.

Referring to FIG. 5, interconnected core members and filter material combinations 15 are illustrated anchored to a slope. Outlet pipes 12 are shown interconnecting rows of interconnected members to move fluid in a controlled manner from the upper portion of the slope through the core members and outlet pipes to the bottom of the slope.

Figure 6:
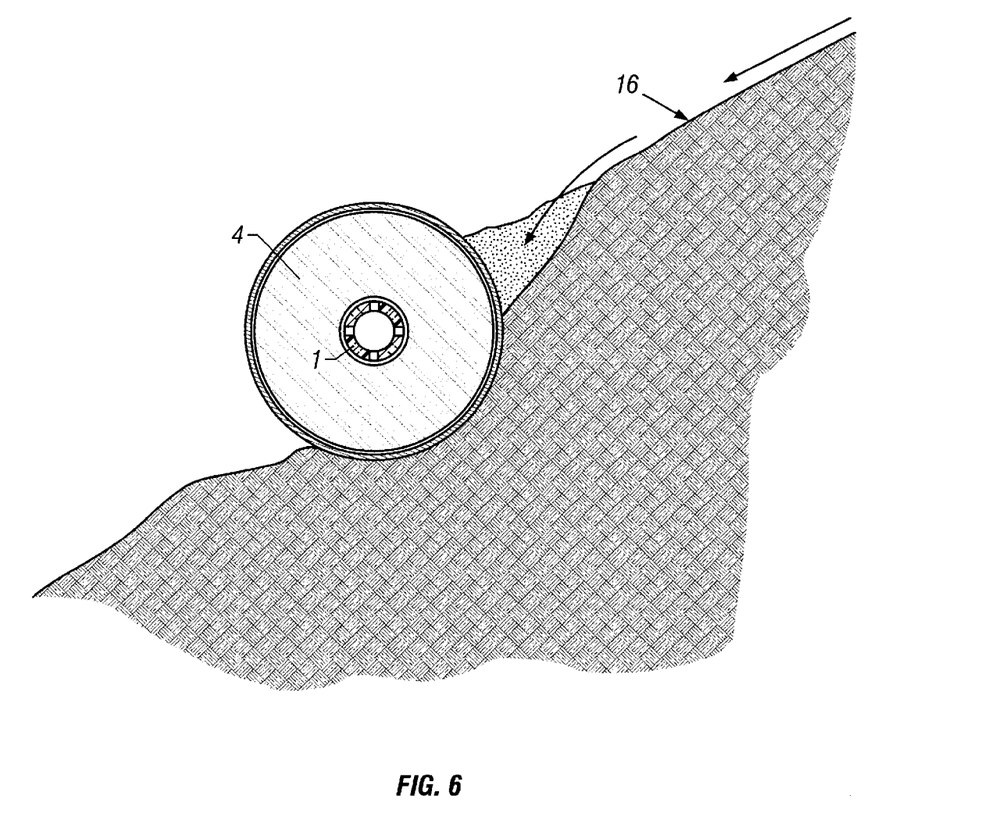
FIG. 6 is a side view of one embodiment of the present invention illustrating its placement on a slope.

Referring to FIG. 6, in practicing one embodiment of the invention, the core member 1 surrounded by the outer filter member 4 may be placed on a slope 16. Fluid carrying sedimentation or debris encounters the filter member. Fluid, debris and sedimentation not retained by the filter material enters the core member via one or more openings or perforations and is routed out of one or both ends of the core member. To retain the core member and filter member in the desired location, the slope may be notched. For example, for a core member having a 2 to 4 inch diameter, the slope may be notched to a depth of approximately three inches.

Figure 7:
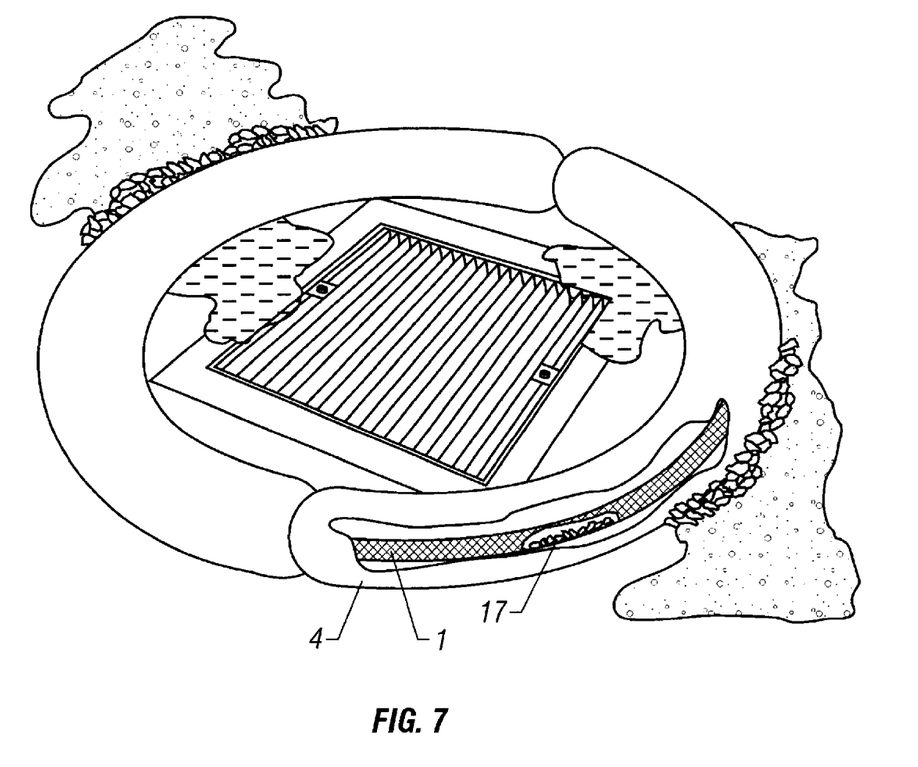
FIG. 7 is a perspective view of one embodiment of the present invention illustrating its placement around a drain inlet.

Referring to FIG. 7, another embodiment of the present invention is illustrated showing interconnected core members 1 surrounded by filter members 4. In this embodiment, at least a portion of the interior of the core member contains a ballast material, such as sand, gravel and the like. In this application, the core member's exterior surface may or may not have ballast 17 as the particular application requires. A flexible core member, such as a flexible plastic pipe allows the core members to be interconnected and positioned in a variety of ways, such as a circle surrounding a drain inlet as illustrated.

In yet another embodiment, a simplified erosion control roll is created having no walled elongated core member or ballast. Such an erosion control roll is comprised of outer filter member 4 and porous covering material 14. Rather than covering the elongated core member with the outer filter member as in the foregoing embodiments, the outer filter member is wrapped upon itself, such that it substantially extends from the outer surface to the center of the erosion control roll. As in the foregoing embodiments, this filter member may be comprised of any suitable filtration material, such as excelsior, straw or foam, for example. In a particularly preferred embodiment, chitosan is applied to this simplified erosion control roll, as discussed in greater detail below.

As an added improvement to each of the foregoing fiber roll embodiments, one or more fiber roll components may have chitosan applied thereto in order to realize its coagulating and fluid clarifying benefits. As a result, the chitosan enhanced fiber roll is capable of coagulating fine solids in fluids, such that passage of pollution, silt and sediment through the fiber roll is reduced. Chitosan is available commercially from several sources, with one example being Vanson, Inc. of Redmond, Wash. Chitosan can be obtained in a basic white or beige granular or powdery form, or alternatively, may come in a liquid form or a gel time-release form. Such forms are commercially available, for example, from Vanson, Inc. under the trade names "Storm Klear Liqui-Floc" and "Storm Klear Gel Floc" respectively. Although chitosan may be applied to a fiber roll in any way deemed effective, it is preferable to thoroughly spray a liquid solution of chitosan onto a flat blanket comprising the outer filter member before this blanket is then rolled around the elongated core member. While a liquid form of chitosan is preferred, any other form, such as a powder, may be applied to the fiber roll. An application of chitosan in powder form is preferably accompanied by dampening or wetting the flat blanket, such that the chitosan powder substantially sticks to the blanket material and is thereby retained within the blanket for a longer period of time.

Figure 8:
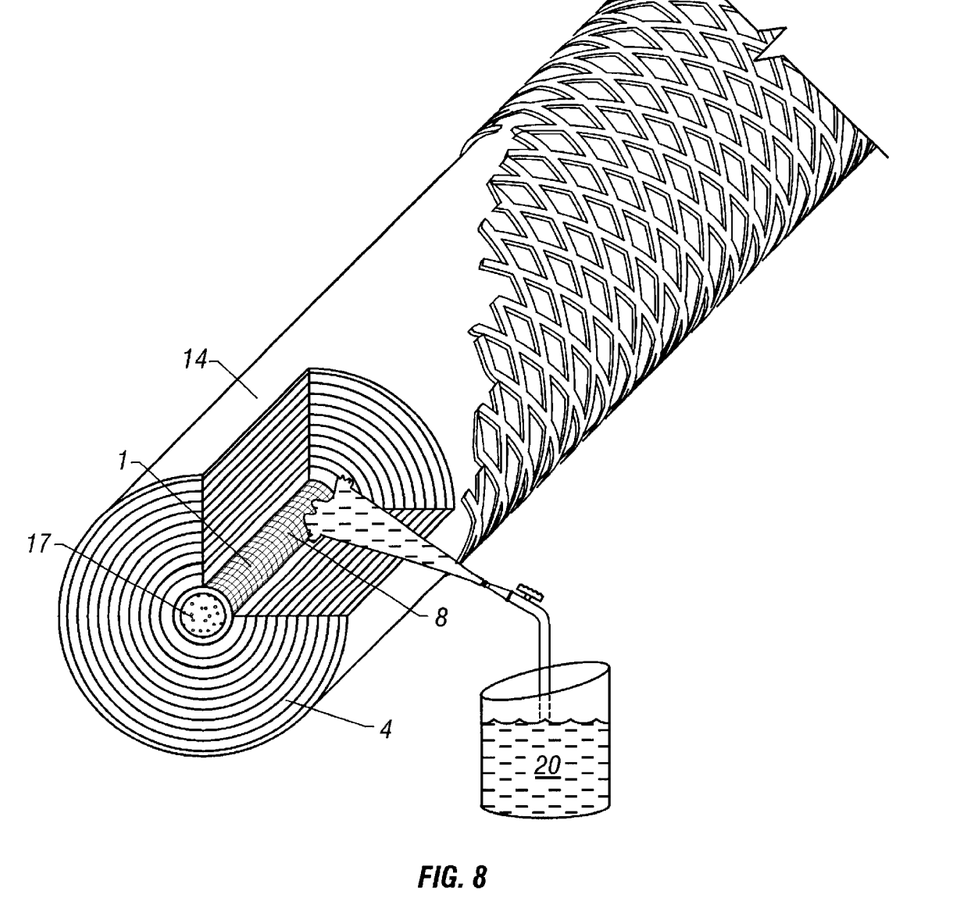
FIG. 8 is a cut-away cross-sectional view of a chitosan enhanced embodiment of the present invention.

Referring now to FIG. 8, a cut-away cross-section of a particularly preferred embodiment of the present invention is illustrated. A walled elongated core member 1 having first and second ends, an interior space, a longitudinal axis, a periphery extending around the core member in a line perpendicular to the longitudinal axis, and one or more openings in the wall communicating the interior space with the exterior of the core member is created. While both the first and second ends of the core member may be open, this is not particularly necessary where fiber rolls are not to be connected. As in the foregoing description, the core member may comprise a flexible plastic pipe, such as high-density polyethylene pipe having a plurality of perforations, or alternatively, may simply comprise a flexible open weave pipe capable of retaining ballast material, such as a plastic netting. Such a netting may have relatively large openings 8 communicating its interior space with the exterior of the core member, such that it is preferable to tie off or otherwise close the first and second ends of the walled elongated core member once ballast is added. As in the foregoing embodiments, the ballast material 17 may comprise rocks, sand, gravel, or any other suitable material for providing weight at or near the core of the fiber roll. In the particularly preferred embodiment, a walled elongated core member having ballast is created by placing a length of flexible netting around an exit chute of a hopper containing gravel. Said length of netting may be about five feet in length and three to six inches in diameter, for example, although a wide range of other lengths and diameters for varying needs are also contemplated. A set amount of gravel is then released into the netting such that the netting is substantially filled. Both ends of the netting are then tied off or otherwise closed to create the walled elongated core member having ballast. Although chitosan 20 may be applied to the walled elongated core member, ballast, or both, it is preferable to at least apply chitosan to the outer filter member or fiber roll, as discussed in more detail below.

A separate blanket of filter material is also formed for covering the elongated core member, such that an outer filter member 4 is formed. As described in the foregoing embodiments, the outer filter member may comprise, for example, straw, excelsior, or a porous foam material, and preferably comprises excelsior, as this material is typically better at absorbing and retaining fluids such as wetted chitosan or a solution containing chitosan. Accordingly, the original blanket shape is formed from such a material. Said blanket is preferably flat, and may be about seven feet by eight feet with a thickness of about one inch, for example, although a wide range of other shapes and dimensions for varying needs are also contemplated. Any form of chitosan may be applied to this blanket, preferably while the blanket is still flat and separate from the elongated core member. For example, pieces of a chitosan time release gel may be distributed in several blanket locations, or powdered chitosan may be sprinkled throughout the blanket, which is preferably wetted such that more of the chitosan remains on the blanket. In a particularly preferred embodiment, a solution containing liquid chitosan is prepared and placed into an airless sprayer. This formula is then sprayed onto the blanket of filter material as the blanket lies flat on a flattened surface, and is preferably sprayed onto both sides of the blanket.

This chitosan enhanced blanket is then preferably dried, as moisture retained during storage or before actual use may tend to spawn localized molds or otherwise reduce the effectiveness of the final product. Drying may be accomplished by leaving the blanket flat for a period of time, by hanging the blanket, by applying heat, or by any other of a number techniques either alone or in combination, as would be readily understood by one skilled in the art. Once the blanket is sufficiently dried, the walled elongated core member comprising flexible netting and having ballast is place along one edge of the blanket as it lies flat. The edge of the blanket is then attached or otherwise held against the elongated core as the blanket is continuously wrapped around the core in a spiral-like fashion. In this manner, the blanket is made to cover the elongated core, such that the blanket forms an outer filter member situated around the elongated core. This covering or wrapping step is preferably performed such that the complete diameter of the fiber roll is approximately eight to twelve inches, although this dimension may vary as desired and depending upon the original dimensions of the elongated core and blanket. As discussed in the foregoing embodiments, a porous covering material 14, such as a woven cloth or netting may surround the outer filter member in order to hold the entire fiber roll together as one unit. This porous covering material, which is preferably a netting similar to that used for the walled elongated core member, may also contain a handle (not shown) attached to each end for ease in transporting the completed fiber roll. In an alternative to the preferred order of steps, the blanket may be wrapped around, folded over or otherwise made to cover the elongated core before drying the fiber roll as one completed unit. In yet another embodiment, no elongated core member is used and the blanket is simply wrapped around itself to form a simplified erosion control roll enhanced with chitosan.

After the chitosan enhanced fiber roll is completely dried and assembled, it is preferably placed into and stored inside a protective container to prevent its exposure to moisture or other sources that might use up or otherwise degrade or reduce the future effectiveness of the applied chitosan. In a particularly preferred embodiment, this protective container comprises a plastic tube having sealed ends, and the container is then vacuum-sealed once the completely assembled and treated fiber roll is placed inside. While a sealed container is not typically necessarily for non-chitosan enhanced fiber rolls, use of a container can be effective in preserving the desired effects of chitosan where fiber rolls so enhanced are to be shipped, stored, or otherwise not put to immediate use after their manufacture.

Numerous other variations and embodiments can be discerned from the above detailed description of the invention and illustrations thereof, and all such variations are encompassed within the scope and spirit of the present invention.

What is claimed is:

1. An apparatus, comprising:
   (a) an elongated core member having a longitudinal axis and a periphery extending around said core member in a line perpendicular to said longitudinal axis, said core member further defined by a first end, a second end, an exterior surface and an interior space;
   (b) an outer filter member surrounding said core member; and
   (c) chitosan applied to at least one of said core member and said outer filter member.
2. The apparatus of claim 1, wherein said core member is at least partially filled with a ballast material.
3. The apparatus of claim 2, wherein said ballast material comprises rocks, gravel or sand.
4. The apparatus of claim 1, wherein said outer filter member comprises a fiber roll.
5. The apparatus of claim 4, wherein said fiber roll comprises excelsior or straw.
6. The apparatus of claim 1, wherein said outer filter member comprises a porous foam material.
7. The apparatus of claim 1, wherein said core member is eccentrically positioned within said outer filter member.
8. The apparatus of claim 1, further comprising one or more openings in said core member communicating said interior space with the exterior of said core member.
9. The apparatus of claim 8, wherein said core member comprises a flexible plastic pipe or netting.
10. The apparatus of claim 1, further comprising:
    (d) a plurality of ribs extending along at least a portion of said exterior surface of said elongated core member.
11. The apparatus of claim 10, further comprising:
    (e) one or more openings in one or more of said ribs communicating said interior space with the exterior surface of said core member.
12. An apparatus, comprising:
    (a) an elongated core member having a first end, a second end, and an interior space;
    (b) an outer filter member surrounding said core member;
    (c) a ballast material filling at least a portion of said interior space; and
    (d) chitosan applied to at least one of said core member, said outer filter member and said ballast material.
13. The apparatus of claim 12, further comprising one or more openings in said elongated core member communicating said interior space with the exterior of said core member.
14. The apparatus of claim 12, wherein said ballast material comprises rocks, gravel or sand.
15. The apparatus of claim 12, wherein said core member comprises a flexible plastic pipe or netting.
16. A method for forming an erosion control roll comprising the steps of:
    (a) creating an elongated core member having a first end, a second end, and an interior space;
    (b) forming a separate blanket of filter material;
    (c) applying chitosan to said blanket of filter material; and
    (d) covering said elongated core member with said blanket of chitosan enhanced filter material, such that said blanket forms an outer filter member situated around said elongated core member.
17. The method of claim 16, wherein said step of creating an elongated core member includes filling said elongated core member with a ballast material.
18. The method of claim 16, wherein said step of applying chitosan includes spraying a liquid form of chitosan onto said blanket of filter material.
19. The method of claim 16, further comprising the step of:
    (e) drying said blanket of filter material after the step of applying chitosan to said blanket.
20. The method of claim 16, further comprising the step of:
    (e) placing said erosion control roll into a sealed container.
21. An erosion control roll, comprising:
    (a) a filter member having a longitudinal axis and a periphery extending around said filter member in a line perpendicular to said longitudinal axis, said filter member further defined by first and second ends and an exterior surface; and
    (b) chitosan applied to said filter member.
22. The erosion control roll of claim 21, further comprising
    (c) a porous covering material around said exterior surface of said filter member.
23. The erosion control roll of claim 22, wherein said porous covering material comprises a woven cloth or netting.
24. The erosion control roll of claim 21, wherein said filter member comprises a fiber roll.
25. The erosion control roll of claim 24, wherein said fiber roll comprises excelsior or straw.
26. The apparatus of claim 21, wherein said outer filter member comprises a porous foam material.

* * * * *